Feb. 13, 1962  H. BACK  3,021,159
IMPROVED MEANS FOR CONNECTING TUBULAR, ROD-LIKE
OR OTHER STRUCTURAL MEMBERS
Filed Sept. 4, 1959  3 Sheets-Sheet 1

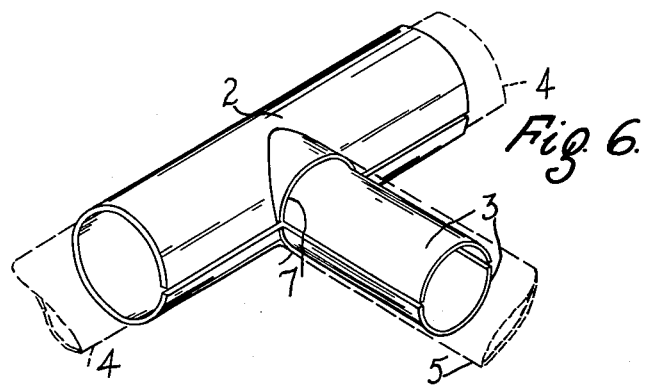
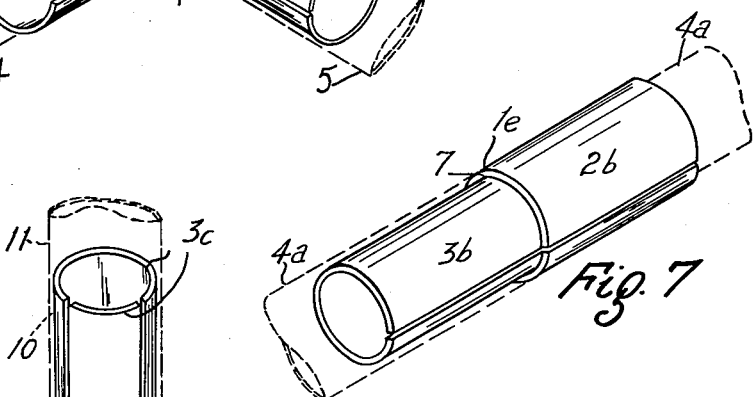
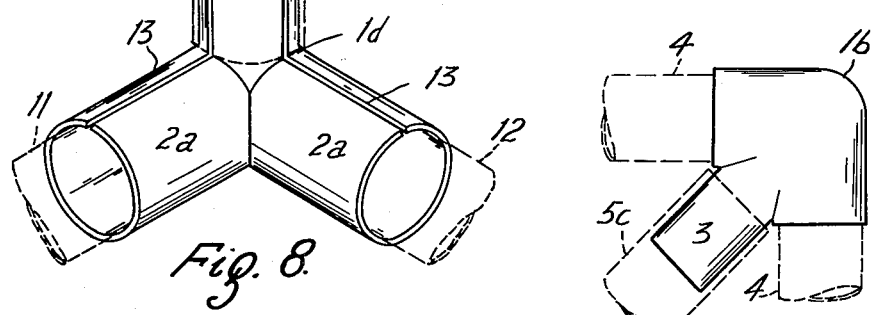
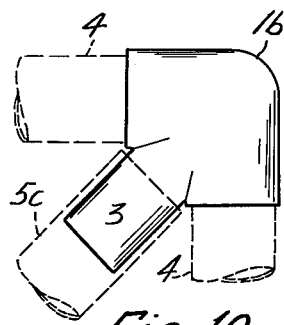
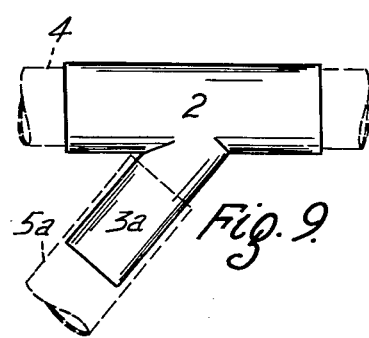
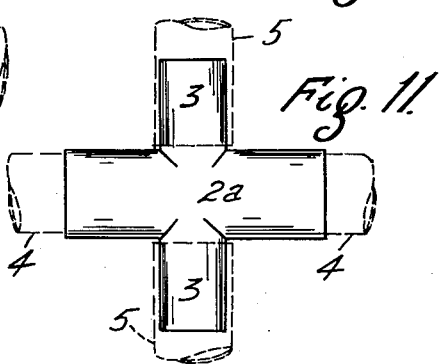

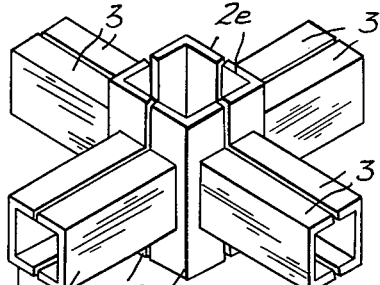
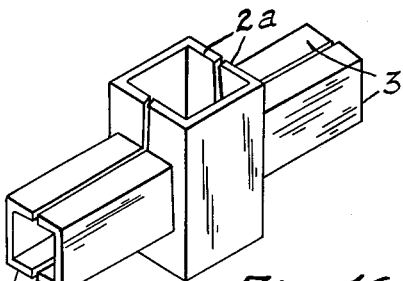
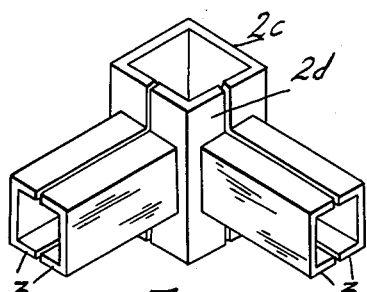
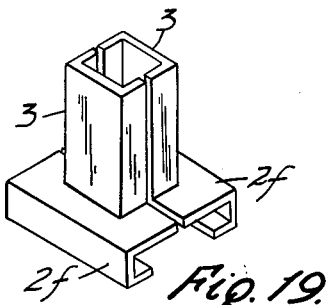
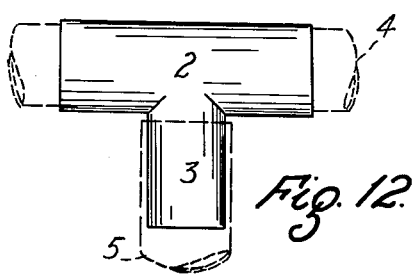
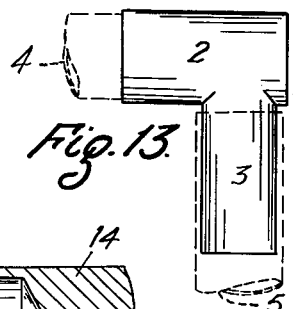
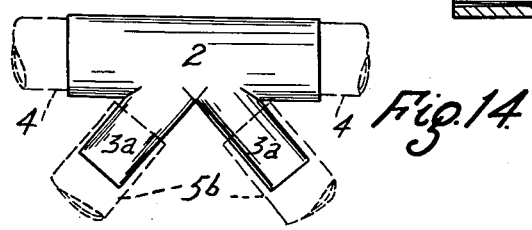
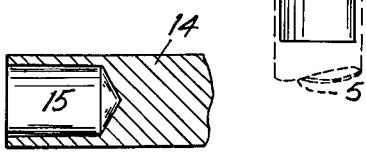

United States Patent Office 3,021,159
Patented Feb. 13, 1962

3,021,159
IMPROVED MEANS FOR CONNECTING TUBULAR, ROD-LIKE OR OTHER STRUCTURAL MEMBERS
Hymie Back, Raedene, Johannesburg, Union of South Africa, assignor to B.U.T.C.O.N. Sales Division (Proprietary) Limited, Johannesburg, Union of South Africa
Filed Sept. 4, 1959, Ser. No. 838,077
Claims priority, application Union of South Africa Nov. 13, 1958
5 Claims. (Cl. 287—54)

This invention relates to an improved means for connecting tubular, rod-like or other structural members together. The invention enables such members to be connected either at an angle or angles to one another or in endwise relationship. The invention enables joints or connections to be made between tubular and/or rod-like or other structural members, which heretofore have necessitated welding or the use of cumbersome clamping devices. The invention is particularly applicable to the manufacture of tubular furniture, ladders, shelving and all manner of frame structures, including scaffolding.

According to the invention, the means for connecting tubular and/or rod-like or other structural members together, consists in providing a connector comprising a hollow clamping part or parts adapted to embrace at least one structural member which is to be connected to another, said clamping part or parts being provided with at least two coacting pressure applying lever extensions which, on passing thereover of a tubular or like end region of another structural member, required to be connected to the first-mentioned structural member or members, constricting fashion are forced towards one another or together and adapted to thereby cause sufficient closing of the clamping part or parts to perform a gripping action on the first-mentioned structural member or members inserted therein or therebetween so that it has an embracing and wrapped-around effect whereby gripping pressure is applied to substantially the whole of the circumference of the member or members which is gripped by the connector.

The structural member employed as the closing member on the lever extensions is a snug and tight sliding fit over such extensions and exerts a wedging-like action when forced thereon, such action, besides increasing the clamping pressure by drawing the clamping part tightly around the structural member or members which it embraces, enables the structural member forming said closing member to be rigidly and immovably secured to the structural member or members which the clamping part embraces.

In the simplest form of the connector, capable of being clamped on to a cylindrically shaped member such as a length of piping, consists of a clamping part in the form of a slit tubular section with two coacting lever extensions projecting therefrom, one on each side of the slit opening and substantially in line with the other. The said slit tubular section clamping part must have flexible and/or resilient characteristics in order to be drawn tightly on to the circumferential surface which it is adapted to embrace. Said lever extensions are of arcuate cross-sectional shape when required to be received in a cylindrically shaped tube or pipe and are adapted slidably to receive the tubular closing structural member which is a snug and tight fit thereover so that on forcing said lever extensions together tension is applied to the clamping part for drawing such part tightly around the pipe over which it is applied.

The clamping part of the connector is arranged to fit the outside of piping having specific external and internal dimensions, while the two lever extensions are of the required arcuate cross-sectional form to be fitted into the bore of the same piping or other piping of specific internal dimensions.

Although the invention is particularly applicable for the connection of tubular or cylindrical members, it will be understood that by varying the sectional form of the clamping part and/or the lever extensions, the invention may be used to connect all manner of structural and other members which are of square, oval, triangular or other non-circular shape in cross-section. It will also be understood that members having different cross-sectional shapes may be connected together by suitable variations of the cross-sectional shapes of the clamping part and lever extensions respectively.

A single slit clamping part may be provided with one or more pairs of coacting lever extensions projecting therefrom, either at right angles or at an acute angle or angles, as the case may be.

In a modified construction of the connector the clamping part, instead of being in one piece, is made in the form of at least two coacting parts with at least one pair of lever extensions projecting from each side in substantially opposite directions so that when the structural members are engaged sleeve fashion over each coacting pair of lever extensions, the coacting clamping parts are made to grip on to a third member inserted between them.

In a further modified construction, the lever extensions are arranged to extend from one end of a slit clamping part, whereby structural members can be connected in end-to-end or coaxial relationship.

Although the gripping action, capable of being exerted by the clamping part or parts, as the case may be, may be sufficient to inhibit any relative sliding movement, more rigid connection may be obtained, such as by providing small inward deformations on the walls of the overlapping connecting parts, or by passing rivets or bolts through holes therein, or by spot welding at any one or two points. However, the invention is intended to be used without the use of rivets, bolts or spot welding.

The connectors in the various forms required are die pressed from blanks of a suitable sheet metal, such as mild steel, and are made in standard sizes to suit standard structural members.

In order that the present invention may be more clearly understood and carried into effect, reference will now be made to the accompanying sheets of drawings on which like reference numerals refer to like parts throughout the several views.

In the drawings:
FIGURE 1 is an elevation of the simplest form of connector for tubular elements according to this invention;
FIGURE 2 is a front view of the connector shown in FIGURE 1, showing such connector in the initial position for connecting two pipes together;
FIGURE 3 is a view similar to FIGURE 2, showing a further stage of connecting two pipes;
FIGURE 4 is a view similar to FIGURE 2, showing the final position of the connector connecting two pipes disposed at right angles to one another;
FIGURE 5 is a view showing a connector according to this invention, composed of two parts for connecting two oppositely directed pipe ends to a pipe arranged at right angles thereto;
FIGURE 6 is an isometric view of a modified form of connector of the type shown in FIGURES 1 to 4;
FIGURE 7 is an isometric view of a connector according to this invention for connecting two pipes in coaxial arrangement;
FIGURE 8 is an isometric view of a connector according to this invention for connecting the ends of three pipes arranged at 90° relative to one another:
FIGURE 9 is an elevation showing a connector according to this invention for connecting the end of a pipe to a second pipe and which pipes are arranged at an acute angle relative to one another;

FIGURE 10 is an elevation of a connector according to this invention for connecting together the ends of three pipes arranged in a common plane;

FIGURE 11 is a view of a modified form of pipe connector of the type shown in FIGURE 5;

FIGURE 12 is an elevation of a further modified form of connector of the kind shown in FIGURES 1 to 4;

FIGURE 13 is an elevation of a still further form of connector of the type shown in FIGURES 1 to 4;

FIGURE 14 is an elevation of a connector of the kind shown in FIGURE 9 for connection of the ends of two pipes to the intermediate region of a third pipe relative to which the first two pipes are arranged at acute angles;

FIGURE 15 is a fragmentary cross-sectional view of the end of a solid structural member adapted to be employed as a closing member on a connector according to this invention;

FIGURE 16 is a connector of the kind shown in FIGURES 5 and 11 suitable for the connection of structural members of square cross-sectional shape;

FIGURE 17 is an isometric view of a connector according to this invention for connecting the ends of square sectioned tubular structural members arranged at right angles to one another to a further square cross-sectioned structural member arranged at right angles to the other two members;

FIGURE 18 is an isometric view of a connector according to this invention for connection of the ends of four structural members to a further structural member arranged at right angles to said four members; and FIGURE 19 is an isometric view of a connector according to this invention for connecting a tubular structural member to a flat bar-like member.

Figure 1:
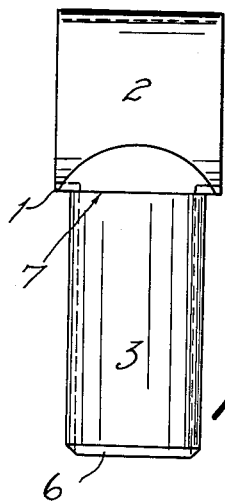

Referring to the drawings, and more particularly to FIGURES 1, 2, 3 and 4, the connector 1, for connecting two pipes together, consists of a sheet metal pressing. Such pressing, formed from a substantially rectangularly shaped sheet material piece, has its centre region curved transversely to its major axis to form the clamping part 2. Said clamping part 2 is shaped to be in the form of a split collar for slipping on to a pipe whereas the end regions of said strip are shaped semi-circularly in the direction of the major axis for said semi-circular end regions, when pressed together, to form a tubular projection arranged transversely and extending from the split collar-like clamping part 2. Said end regions form lever extensions 3 whereby the clamping part 2 may be subjected to considerable tension for such clamping part 2 to wrap itself closely on to the circumferential surface of the pipe or the like on to which it is placed for clamping thereon.

The device shown in FIGURES 1 to 4 is intended for clamping two similar pipes 4 and 5 together with pipe 5 at right angles to pipe 4. The extreme ends of the lever extensions 3 are chamfered or bevelled as at 6 to facilitate the insertion into the end of pipe 5. The connecting regions between the clamping part 2 and the lever extensions 3 are shaped to form shoulders 7 in order to enhance the appearance of the pipe connection when pipe 5 has been driven home. In the normal condition of the connector, as supplied by the manufacturer, the lever extensions 3 are preferably arranged in inward converging relationship so that the clamping part 2 may be in an expanded position for it to be easily slipped over the pipe 4. As the clamping part 2 must have resilient and flexible characteristics, such connector 1 may also be engaged on to a pipe 4 by engaging the diverging regions of the lever extensions 3 on to such pipe and applying pressure on to the clamping part.

The lever extensions 3, when in their normal converging positions, are held in such position by spring action offered by the clamping part 2 so that such lever extensions always have an outwardly biasing action which facilitates the proper functioning of the connector, as will be subsequently explained.

Figure 2:
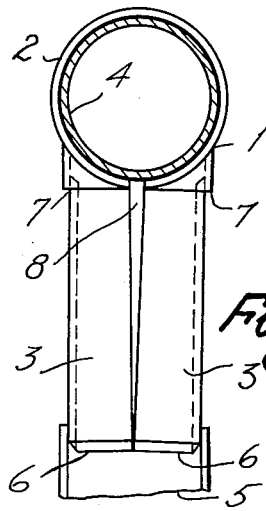
Figure 3:
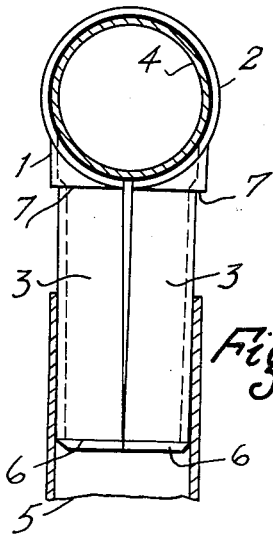
Figure 4:
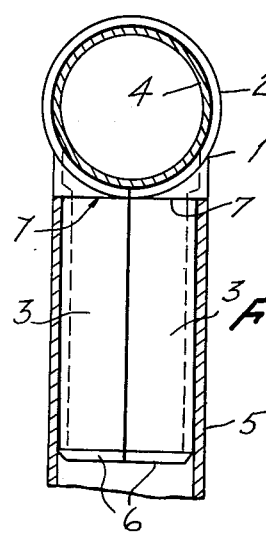

The ends of the lever extensions 3 are inserted into the end of pipe 5. This can only be effected by forcing the end regions of such lever extensions 3 together whereby the coacting edges of such lever extensions form wedge-like gaps 8, as is shown in FIGURE 2. The widest part of such wedge shaped gap 8 is formed at the connection of such extensions to the clamping part 2 while at the free end such coacting edges engage one another. As the pipe 5 is pressed over the lever extensions 3, considerable pressure is applied to the outwardly directed faces of such extensions whereby the clamping part, now acting as a strap, is subjected to tension causing such clamping part to gradually stretch and wrap itself, under tension, around the pipe 4 which it is intended to grip. The effect of the particular shaping of the lever extensions is that of a wedge or an inclined plane. Each inclined plane formed by the outwardly directed face of each lever extension 3 has a rise of half the distance of the gap at the clamping part end. When forcing the pipe 5 along the lever extensions 3, a considerable mechanical advantage is produced. The extent of the gap must be such as to allow for stretch of the material of the clamping part and would therefore vary with the different materials which may be used and would depend on the gauge of the pipe as not to cause bursting of such pipe by excessive loading.

A further important aspect of the design of the connector according to this invention is that the V-shaped gap 8 at the connections to the clamping part allows just sufficient space for the material of the clamping part to elongate within its elastic limit without going beyond such limit otherwise the stretching effect nullifies the gripping tension which is required for holding of the connector.

In addition to the outward pressure exerted within pipe 5, an additional factor is effective to hold the pipe 5 on the lever extensions 3. Said additional factor is the resiliency presented by the clamping part 2 which normally retains the lever extensions in outwardly diverging positions. Such resilient forces of the clamping part present the lever extensions with outwardly directed forces. Although these forces are very small compared to the force exerted by the wedging action, such outward pressure, not only by the spring action of the clamping part but also by the natural tendency of the clamping part to regain its original state, retains the lever extensions in close contact throughout their length with the internal face of the pipe 5 instead of only at the widest point of such outwardly directed faces of such extensions. At the same time, the pipe 4 is held in compression by the clamping part. The effect of these equal forces is to create a binding tie of equal strength at all points.

This factor, together with additional force exerted, provides for a stronger clamping action which otherwise would have no advantage beyond the ordinary press fit. The holding power of the pipe 5 on the lever extensions 3 is further increased by the rough surfaces of the interior of the pipe 5 and of the convex faces of the lever extensions 3 which are caused to be retained in close contact whereby twisting or loosening becomes almost impossible. As the connector according to this invention is particularly, but not exclusively, intended for use on welded pipes, the inside seam of such welded pipes, however thin or unnoticeable, is sufficient to cut into a lever extension along the whole length of the latter and thus has a considerable holding effect. Furthermore, the holding effect may be increased should corrosion on the coacting surfaces take place which would further bind such surfaces together so that separation becomes practically impossible.

The taper presented by the lever extensions 3 allows an easy entry into the pipe 5 followed by an outward thrust on the pipe which increases when the penetration of the lever extensions 3 increases into the pipe 5.

With a connector according to this invention, it is found that at no position is either the clamp or the pipes stronger but of equal strength when the connector is manufactured from the same material and of the same gauge material as the pipes. A welded joint on the other hand would give a stronger joint but would cause a weak point at that section of the tube where the heat has been applied which caused annealing of the metal. Furthermore, the necessity of cleaning the welded or brazed joint might make that joint weaker because the cleaning of this joint is usually by unskilled labour and the filing or grinding of the joint would weaken it. The connector according to this invention is intended as a substitute for welding while no soldering or application of heat at any stage is required. Furthermore, the application of the connector according to this invention is such that simple tools are required and that the ordinary layman or householder can make up a considerable range of articles such as gates, fences, stands, tables, shelving and the like.

In the modified form of construction of the connector, as shown in FIGURE 6, the ends of the clamping part 2 are arranged to extend well beyond the sides of the lever extensions 3 to provide a compartively long slitted collar whereby increased clamping area is provided on the pipe 4. In addition, this extended clamping part 2 may be used for the connection of two in-line pipes 4. In the simplified form of the connector shown in FIGURE 12, the shoulder forming regions 7 have been eliminated. In the form of construction shown in FIGURE 13, the clamping part 2 has been extended in one direction only whereby a corner forming connection of pipes 4 and 5 may be formed.

The connector, as shown in FIGURE 9, is substantially the same as shown in FIGURES 1 to 4 and FIGURE 12 but the lever extensions 3a in this form of construction are placed to extend obliquely from the clamping part 2 instead of at right angled positions to permit for connection of the end of a pipe 5a arranged at an angle relative to pipe 4. In the form of construction according to FIGURE 14, two obliquely disposed pairs of lever extensions 3a are provided on the clamping part 2 for closing engagement by the ends of two pipes 5b disposed at acute angles relative to the pipe 4.

In the construction form according to FIGURE 10, a connector 1b is provided for connecting the ends of two pipes 4 arranged at right angles relative to one another while the lever extension 3 are arranged to be engaged by a further pipe 5c arranged diagonal fashion relative to the pipes 4.

The connector 1d, shown in FIGURE 8, provides for the connection of the ends of three pipes 10, 11 and 12, which are all arranged at right angles relative to one another. The connector 1d provides two clamping parts 2a arranged at right angles relative to one another in a common plane and two perpendicular lever extensions 3c which, however, are of different arcutate lengths for the coacting joining regions to be arranged in-line with the slits 13 of the clamping parts 2a.

The connector 1e, shown in FIGURE 7 which is a variation of the aforementioned connectors but embodies the same principles, provides for the in-line clamping together of the ends of two pipes 4a. In this form of construction, the tubular closing member pipe 4a is arranged to coact over slitted extension 3b of the slitted clamping part 2b, such extension 3b being provided on one end of the slitted clamping part 2b while a shoulder 7 is formed therebetween thus providing a slitted tubular connector 1e of stepped formation.

Figure 5:
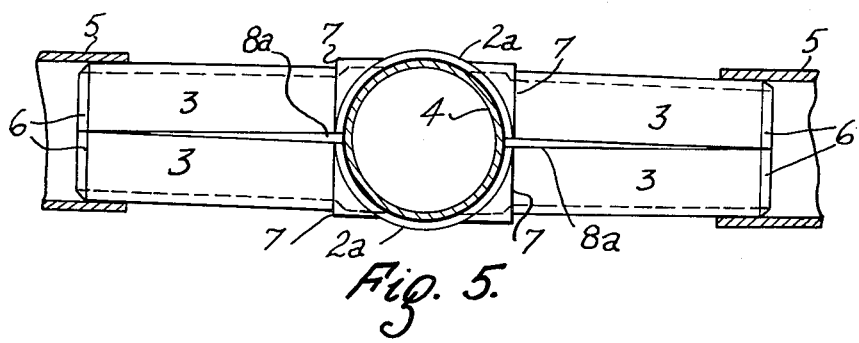

All the aforereferred to connectors consist of a single pressed sheet metal or plate metal part but the present invention also provides for connectors consisting of two coacting parts, as is illustrated in FIGURES 5, 11, 16, 17 and 19. The connectors shown in FIGURES 5, 11 and 16 are intended for the connection of the ends of two in-line pipes on to a further pipe arranged at right angles but in the same plane.

In the connector shown in FIGURE 5, each component of such connector presents an intermediate substantially or almost semi-circular clamping part 2a from which lever extensions 3 extend from opposite sides and which are arranged transversely to the axis of such almost semi-circular clamping part 2a. The two parts of such connector are identical and are arranged to form the tapering spaces 8a between the coacting edges of coacting lever extensions 3. The ends of the lever extensions 3 are also chamfered or bevelled as at 6. In this connecvtor, shoulders 7 are preferably also formed.

In the connector according to FIGURE 11, the clamping parts 2a are arranged to extend well beyond the sides of the lever extensions 3 while to simplify the construction the shoulder-forming regions are eliminated. The connector shown in FIGURE 16 is substantially similar to that shown in FIGURE 11 but shows a connector for application on structural members of square cross-sectional shape.

The connector according to FIGURE 17 is shown as intended for connecting square sectioned structural members but this clamp may also be readily constructed for engaging circular cross-sectioned pipes. The outer clamping part 2c is adapted to extend around the pipe or member which it is adapted to engage through an angle of slightly less than 270° whereas the inner clamping part 2d extends through an angle of just less than 90° while each of such clamping parts provides two lever extensions 3. On engagement of the lever extensions 3 into a pipe or like sleeve-like end of a structural member, the clamping parts 2c and 2d are also drawn tightly around the pipe or the like engaged by the clamping parts 2c and 2d.

In the connector according to FIGURE 18, four similar parts are provided each comprising a clamping part 2e extending through an angle of just less than 90° and having two lever extensions 3. With the aid of such connector, the ends of four structural members located in a common plane may be connected to a single structural member arranged perpendicularly thereto. The connector according to FIGURE 18, when adapted for use on pipes, only provides for location of the ends of the four pipes arranged in a common plane but does not provide for a connection capable of withstanding tension and therefore only locates such four pipes relative to the centre pipe.

The connector shown in FIGURE 19 is particularly intended for the connection of a tube or structural member at right angles on to a flat bar. This connector also comprises two parts each presenting a bar clamping part 2f and a lever extension 3 which is adapted to be engaged sleeve fashion by a structural member for causing the clamping parts 2f to clamp tightly on to the sides of the bar.

Where it is desired to connect the end of a solid bar, rod or the like with any one of the connectors according to this invention on to another structural member, pipe or the like, the end of such bar, rod or the like 14 is provided with an axial recess 15 which is adapted to slidingly engage over a coacting pair of lever extensions 3 in the same fashion as a pipe.

As aforesaid, the connectors may be constructed to connect together pipes or other structural members of different transverse measurements and of different shapes.

What is claimed is:

1. A connector composed of a sheet-like material having an elastic limit, said connector for use, singly and in combination, to connect hollow-ended structural members having outer surfaces and inner end surfaces, said connector comprising: a clamping part shaped to conform to said outer surfaces positionable embracing one of said structural members; at least two lever extensions extending from said clamping part positioned to be drawn together in opposed combination for constricting said clamping part around an outer surface of a said embraced structural member, each of said lever extensions having a free end, and each pair of said opposed lever extensions having a shape conforming to said inner end surfaces for forced sleeve-like engagement therein to a preselected axial extent in assembled condition in said sleeve-like engagement, said opposed lever extensions being drawn together in opposed combination in an assembled condition with free ends in contact defining a wedge and having opposing longitudinal edges defining therebetween wedge-shaped spaces opening inwardly toward said clamping part, said inner end surfaces when disposed in said forced sleeve-like engagement closing said wedge-shaped spaces from said free ends to cause said lever extensions to constrict said clamping part to tightly embrace the outer surface of one said hollow ended structural member, said clamping part being elongated thereby to an extent dependent on said preselected axial extent of said forced sleeve-like engagement of said opposed lever extensions with the inner end surfaces of another said hollow ended structural member, to thereby connect said structural members.

2. A connector as described in claim 1 wherein dual purpose stop means disposed intermediate said clamping part and each of said lever extensions are provided for distributing stresses around said clamping part and for limiting the elongation of said clamping part to within the elastic limit of said sheet-like material composing said clamping part.

3. A connector as described in claim 2 characterized in that said dual purpose means comprises means defining a shoulder intermediate said clamping part and each of said lever extensions, said shoulder-defining means having a configuration for strengthening said connector at the juncture of said lever extensions and clamping part and for distributing said stresses around said clamping part, and said shoulder limiting said forced sleeve-like engagement to a preselected extent by providing a stop for the end of said other structural member, and thereby limiting the stresses exerted on said clamping part to a preselected value within said elastic limit of the sheet like material of said clamping part.

4. A connection of structural members having hollow ends comprising: a plurality of said structural members; connector means composed of material having an elastic limit, said connector means comprising clamping means disposed around one structural member and shaped to fit partially around said one structural member in an unassembled condition and tightly embracing said structural member in an assembled condition, said connector means having opposing lever means extending from said clamping means disposed in sleeve-like engagement in a hollow end of another structural member and positioned for constricting said clamping means around said one structural member, said opposing lever means defining a wedge with wedge-shaped spaces therebetween, said wedge-shaped spaces having open ends adjacent said clamping means, and said opposing lever means cooperating in closing said wedge-shaped spaces by said forced sleeve-like engagement to tighten said clamping means for elongating said partially fitting clamping means more completely around said one structural member in said assembled condition; and shoulder means intermediate said clamping means and lever means for axially limiting said sleeve-like engagement to a preselected extent thereby limiting said resulting elongation to within said elastic limit; whereby said structural members are rigidly connected by said connector maintaining said connection by the compressive pressure on one said structural member of said elongated clamping means seeking to return to its unelongated unassembled condition and by the compressive pressure of a hollow end of another said structural member on a said opposed pair of lever means in said forced sleeve-like engagement augmented by the pressure exerted on said opposing lever means by said elongated clamping means seeking to return to said unelongated unassembled condition.

5. A connector of tensile material for connecting structural members at least one of which have hollow ends comprising, a clamping part in an unstretched condition for partially embracing a structural member, and clamping part constricting means attached to said clamping part for forced sleeve-like engagement in a hollow end of another structural member, said clamping part constricting means comprising wedge surfaces for causing said forced sleeve-like engagement to constrict said clamping part in an assembled condition around said partially embraced structural member to stretch the tensile material of said clamping part thereby to add the tensile force of said material tending to restore the clamping part to its unstretched condition to the force of said forced sleeve-like engagement for holding said connector in frictional fixed assembled engagement with said structural members connecting them.

References Cited in the file of this patent
UNITED STATES PATENTS

| | | |
|---|---|---|
| 389,180 | Wiggins | Sept. 4, 1888 |
| 1,224,269 | Broadbent | May 1, 1917 |
| 1,916,634 | Pajeau | July 4, 1933 |

FOREIGN PATENTS

| | | |
|---|---|---|
| 929,297 | France | July 7, 1947 |
| 1,160,827 | France | Mar. 10, 1958 |